(12) United States Patent
Sodagar

(10) Patent No.: US 12,010,159 B2
(45) Date of Patent: Jun. 11, 2024

(54) TRIGGERING OF EDGE SERVER DISCOVERY AND INSTANTIATION BY A 5GMS-AWARE APPLICATION

(71) Applicant: Tencent America LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/127,981

(22) Filed: Mar. 29, 2023

(65) Prior Publication Data

US 2023/0353617 A1 Nov. 2, 2023

Related U.S. Application Data

(60) Provisional application No. 63/325,520, filed on Mar. 30, 2022, provisional application No. 63/338,354, filed on May 4, 2022.

(51) Int. Cl.
*H04L 29/06* (2006.01)
*H04L 41/12* (2022.01)
*H04L 65/60* (2022.01)

(52) U.S. Cl.
CPC ............ *H04L 65/60* (2013.01); *H04L 41/12* (2013.01)

(58) Field of Classification Search
CPC ............................... H04L 65/60; H04L 41/12
USPC ......................................................... 709/231
See application file for complete search history.

(56) References Cited

U.S. PATENT DOCUMENTS

| 2006/0218601 | A1* | 9/2006 | Michel ................. H04N 21/858 348/E7.071 |
| 2007/0083899 | A1* | 4/2007 | Compton ............ H04L 41/0806 709/227 |
| 2020/0177709 | A1* | 6/2020 | Ezell ..................... H04L 65/765 |
| 2021/0111953 | A1 | 4/2021 | Hall et al. |
| 2021/0352113 | A1 | 11/2021 | Sodagar |
| 2021/0352156 | A1 | 11/2021 | Kim et al. |
| 2022/0014799 | A1 | 1/2022 | Sodagar |
| 2022/0030063 | A1 | 1/2022 | Gupta et al. |

OTHER PUBLICATIONS

International Search Report and Written Opinion in International Patent Application No. PCT/US236/65136 dated Jul. 31, 2023, 15 pages.
3GPP TS 23.558 v17.3.0 (Mar. 2022) 3rd Generation Partnership Project; Technical Specification Group Services and System Aspects; Architecture for enabling Edge Applications; (Release 17) (166 pages).
3GPP TS 24.558 v1.20 (Feb. 2022) 3rd Generation Partnership Project; Technical Specification Group Core Network and Terminals; Enabling Edge Applications; Protocol specification; (Release 17) (106 pages).
3GPP TS 26.501 v17.0.1 (Jan. 2022) 3rd Generation Partnership Project; Technical Specification Group Services and System Aspects; 5G Media Streaming (5GMS);General description and architecture (Release 17) (87 pages).

* cited by examiner

*Primary Examiner* — Jude Jean Gilles
(74) *Attorney, Agent, or Firm* — Crowell & Moring LLP

(57) ABSTRACT

This disclosure relates to an edge-enabled Fifth Generation Media Streaming (5GMS) system that includes a user device having a 5GMS-aware application that sends a request to use edge services to a media session handler of the user device. In response, an edge enabler client of the user device sends a discovery request to an edge data network.

20 Claims, 4 Drawing Sheets

TRIGGERING OF EDGE SERVER DISCOVERY AND INSTANTIATION BY A 5GMS-AWARE APPLICATION

INCORPORATION BY REFERENCE

This application is based on and claims the benefit of priority to U.S. Provisional Application Ser. No. 63/325,520, filed on Mar. 30, 2022, and to U.S. Provisional Application Ser. No. 63/338,354, filed May 4, 2022, the contents of each of which are herein incorporated by reference in their entirety.

TECHNICAL FIELD

This application generally relates to Fifth Generation Media Streaming (5GMS) using edge processing, and more particularly to a 5GMS-aware application that determines to discover available edge application servers.

BACKGROUND

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Utilizing edge processing for 5GMS architecture may be desirable due to the advantages that edge processing provides, such as with respect to latency, response time, bandwidth, and proximity of the processing closer to the user equipment (UE). Accordingly, ways to provision edge services by the client and/or to obtain information about edge application servers may be desirable.

SUMMARY

Aspects of the disclosure provide methods and apparatuses for media streaming and edge resource processing for Fifth Generation Media Streaming (5GMS) applications.

In some implementations, a method for media streaming includes: sending, with a Fifth Generation Media Streaming (5GMS)-aware application of a user device, a request to use edge services to a media session handler of the user device via an M6 interface; subsequent to sending the request to use the edge services, sending, with an edge-enabler client (EEC) of the user device, a discovery request for one or more available edge application servers (EASs); receiving, with the EEC, a discovery response indicating the one or more available EASs; selecting, with at least one of the EEC or the media session handler, a target EAS from among the one or more available EASs indicated in the discovery response; and streaming, with the user device, media content communicated with the target EAS.

In some other implementations, a device for streaming media and/or edge resource processing is disclosed. The device may include circuitry configured to perform any one of the method implementations above.

Aspects of the disclosure also provide one or more non-transitory computer-readable mediums storing instructions which when executed by a computer for streaming media and/or edge resource processing cause the computer to perform any one of the method implementations above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
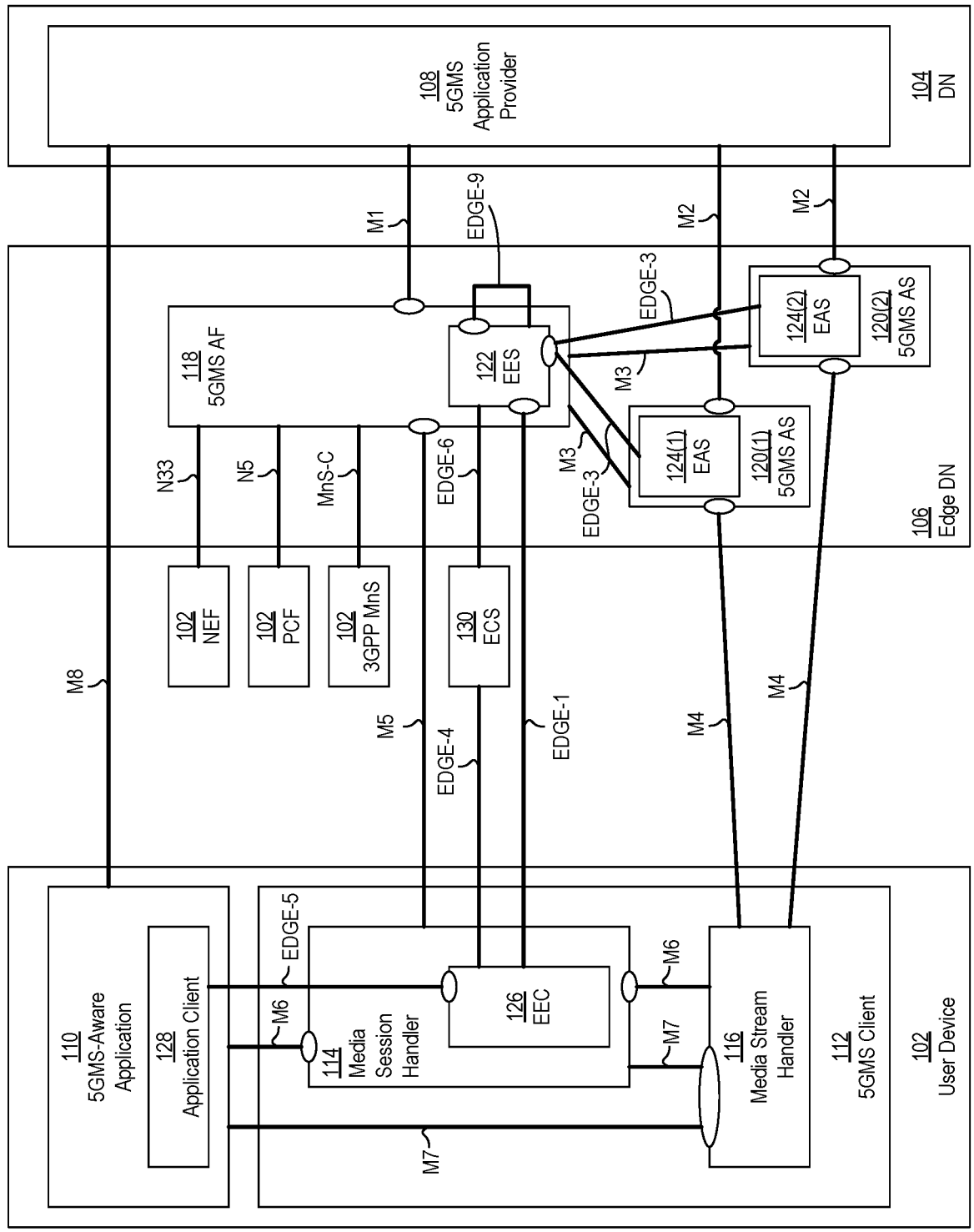
FIG. 1 shows a block diagram of an example edge-enabled Fifth Generation Media Streaming (5GMS) system.

FIG. 1 is a block diagram of an example configuration of an edge-enabled Fifth Generation Media Streaming (5GMS) system 100. In general, a 5GMS system is a collection or assembly of one or more Application Function (AF), one or more Application Servers (AS), and interfaces from 5GMS architecture that supports, or is configured to perform, mobile network operator (MNO) and third-party downlink media streaming services and MNO and third-party upload media streaming services. An edge-enabled 5GMS system has the functionality and 5GMS architecture of a 5GMS system and further supports, or is configured to perform, edge processing (e.g., media processing in an edge data network (DN)). In general, the term "edge" refers to a location at or relatively close to a user. Correspondingly, edge processing (or edge computing) refers to computer processing performed by one or more computing devices considered to be located at or close to a user device.

In the example configuration of FIG. 1, the edge-enabled 5GMS system 100 includes a user device 102, a data network (DN) 104, and an edge DN 106. In general, a user device as described herein, such as the user device 102, may include a single electronic device or apparatus, or multiple (e.g., a network of) electronic devices or apparatuses, capable of communicating over a network. A user device may comprise or otherwise be referred to as a user terminal, a user terminal device, or a user equipment (UE). Additionally, a user device may be or include, but not limited to, a mobile device (such as a mobile phone, a smart phone, a smart watch, a tablet, a laptop computer, vehicle or other vessel (human, motor, or engine-powered, such as an automobile, a plane, a train, a ship, or a bicycle as non-limiting examples) or a fixed or stationary device, (such as a desktop computer or other computing device that is not ordinarily moved for long periods of time, such as appliances, other relatively heavy devices including Internet of things (IoT), or computing devices used in commercial or industrial environments, as non-limiting examples).

In addition, the DN 104 and the edge DN 106 may each include a computing device, or a plurality of computing devices, configured to communicate signals with the user device 102. At least some of the signals that are communicated may be characterized as downlink or uplink. As used herein, the term downlink refers to a transmission direction from a network (e.g., a DN or an edge DN) to a user device. Correspondingly, the network is the origin of the transmission and/or the information or content (e.g., media) included in the transmission, and the user device is the consumer, or acts as the consumption device, of the information or content. In this context, the network transmits, and the user device receives, a downlink transmission. Also, as used herein, the term uplink refers to a transmission direction from a user deice to a network (e.g., a DN or an edge DN). Correspondingly, the user device is the origin of the transmission and/or the information or content (e.g., media) included in the transmission, and the network is the consumer, or acts as the consumption deice, of the information or content. In this context, the user device transmits, and the network receives, an uplink transmission.

For the edge-enabled 5GMS system 100 of FIG. 1, the user device 102, the DN 104, and the edge DN 106 may be configured to establish one or more media sessions and stream media during the one or more media sessions. For at least some configurations, the user device 102, the DN 104, and the edge DN 106 may perform the media streaming and associated functions to establish the media streams and media according to one or more 5GMS technical specifications, standards, and/or protocols, such as Third Generation Partnership Project (3GPP) Technical Specification (TS) 26.501, for example.

In addition or alternatively, each of the user device 102, the DN 104, and the edge DN 106 may include one or more components or modules to enable the communication of media streams and/or establish the media streams and media sessions, such as according to 5GMS specifications. Such components are collectively referred to herein as 5GMS components. For the configuration shown in FIG. 1, the 5GMS components include a 5GMS application provider 108, a 5GMS-aware application 110, a 5GMS client 112, a media session handler 114, a media stream handler 116, a 5GMS application function (AF) 118, and a 5GMS application server (AS) 120. In other configurations, the 5GMS components may include more or fewer than those shown in FIG. 1. Also, as described in further detail below, the 5GMS components may be configured to communicate with each other via or through one or more interfaces M. Unless expressly described otherwise, each of the 5GMS components may be configured to communicate in both the uplink and downlink directions, and each of the interfaces M may handle communication in both the uplink and downlink directions. For at least some configurations, one or more of the 5GMS components and/or one or more of the interfaces M may be separated into a downlink portion to handle downlink functionality and an uplink portion to handle uplink functionality. For simplicity, separate downlink and uplink portions are not separately designated in FIG. 1 or otherwise referenced herein.

In general, the 5GMS application provider 108 is a module of the DN 104 that uses 5GMS for streaming services and that supplies or provides a 5GMS-aware application 110 to the user device 106. The 5GMS application provider 108 may perform, initiate, and/or establish a provisioning session to configure 5GMS features for the 5GMS-aware application 110. In addition or alternatively, the 5GMS application provider 108 may provide functionality and/or procedures used by the 5GMS-aware application 110 that enables the user device 106 to discover an available streaming service and content offerings and select a specific service or content item for access. In addition or alternatively, the 5GMS application provider 108 may perform a service announcement that enables the 5GMS-aware application 110 to obtain 5GMS Service Access Information. In addition or alternatively, the 5GMS application provider 108 uses 5GMS downlink (5GMSd) functions and/or 5GMS uplink (5GMSu) functions for downlink streaming services and/or uplink streaming services, respectively. In addition or alternatively, the 5GMS application provider 108 has content-specific media functionality, such as media creation, encoding, and formatting that uses 5GMS interfaces to stream media to and/or from the 5GMS-aware application 110.

The 5GMS-aware application 110 is a module of the user device 102 that includes service logic of one or more 5GMS application services, and participates in the delivery of a downlink and/or an uplink 5GMS service.

The 5GMS client 112 is a module of the user device 102 dedicated to 5GMS that provides modules internal to the user device 102 with interfaces and/or application programming interfaces (APIs) to communicate with each other and/or to modules or other components external to the user device 102 according to 5GMS. For some configurations such as shown in FIG. 1, the 5GMS client 112 may include the media session handler 114 and the media stream handler 116, although other configurations where one or both of the media session handler 114 or the media stream handler 116 is separate from the 5GMS client 112 may be possible. In other configurations, the user device 102 may include the media session handler 114 and the media stream handler 116, without necessarily having the 5GMS client 112.

The media session handler 114 is a module of the user device 102 that communicates with an 5GMS application function (AF) in order to establish, control, and/or support communication and/or delivery of media during a media session. For at least some configurations, the media session handler 114 may perform additional functions, such as consumption and quality of experience (QoE) metrics collection and reporting. Also, the media session handler 114 may provide network assistance, such as for downlink streaming delivery and/or by providing bit rate recommendations and/or estimations. In addition or alternatively, for at least some configurations, the media session handler 114 may expose one or more APIs for used by the 5GMS-aware application 110.

The media stream handler 116 is a module of the user device 102 that communicates with a 5GMS application server (AS) to perform downlink and/or uplink streaming of media content. The media stream handler 116 may also provide service to the 5GMS-aware application 110 for media capturing and uplink streaming, and to the media session handler 114 for media session control. Also, for at least some configurations, the media stream handler 116 may be configured with a media player that handles the media content streaming, and/or may provide one or more APIs to the 5GMS-aware application 110 for media playback and/or one or more APIs to the media session handler 114 for media session control.

The edge DN 104 is a local data network including one or more computing devices that supports and/or includes the architecture configured to enable edge applications and/or that performing edge computing or processing. The edge DN 106 may include one or more 5GMS application functions (AF) 118 and/or one or more application servers (AS) 120. In the example configuration in FIG. 1, the edge DN 106 includes one 5GMS AF 118 and two ASs 120(1), 120(2). Other configurations of one or more 5GMS AFs 118 and/or one or more 5GMS ASs 120 may be possible.

In general, a 5GMS AF 118 is a module that provides control functions to the media session handler 114 of the user device 102 and/or the 5GMS application provider 108 of the data network 102. For at least some configurations, the 5GMS AF 118 may relay or initiate a request for different Policy or Charging Function (PCF) treatments.

Also, in general, a 5GMS AS 120 is an application server dedicated to 5G media streaming and that hosts 5G media functions. A 5GMS AS 120 may communicate with the media stream handler 116 in order to stream media content. In addition or alternatively, a 5GMS AS 120 may perform content hosting, including, but not limited to, ingesting media content from the 5GMS application provider 108 and caching media content to reduce ingesting the same content repeatedly.

Also, the edge-enabled 5GMS system 100 may include a plurality of interfaces or APIs M used by the 5GMS components to communicate with each other. As shown in FIG. 1, each Mi (where i is an integer) may be used between a respective two of the 5GMS components.

M1 is used to supply a data structure during a provisioning session from the 5GMS application provider 108 to the 5GMS AF that configures features of the 5GMS-aware application 110. The M1 interface may enable the 5GMS application provider 108 to provision the usage of the edge-enabled 5GMS system 100 for downlink and uplink media streaming and to obtain feedback. In addition or alternatively, the 5GMS application provider 108 may use the M1 interface to provision resources in the edge DN 106 for the 5GMS-aware application 110, such as by configuring an edge processing resource template. For at least some configurations, the 5GMS application provider 108 may configure the following over the M1 interface: one or more conditions for activation of edge processing, such as traffic descriptors, an application identifier, or a geographic location of the user device 102; a selection of client-driven or AF-driven management; EAS profile information for each EAS 124 to serve an application, such as service key performance indicators (KPIs), a geographical location, and service continuity support; and/or application context relocation tolerance and requirements.

The M2 interface is an interface between the 5GMS 108 and a 5GMS AS 120 through which a 5GMS AS 120 ingests media content from the 5GMS application provider 108.

The M3 interface is an interface between the 5GMS AF 118 and a 5GMS AS 120 used to exchange information for content hosting on the 5GMS AS 120. The M3 interface may also be used to enable selection of a suitable one of a plurality of 5GMS ASs 120 for a media session.

The M4 interface M4 is an interface between a 5GMS AS 120 and the media stream handler 116. The M4 interface is used to communicate one or more media streams of media content (in the uplink and/or downlink directions) between the 5GMS AS 120 and the media stream handler 116.

The M5 interface M5 is an interface between the 5GMS AF 118 and the media session handler 114 used to communicate information to handle, control, report, and assist with media sessions. The 5GMS AF 118 and the media session handler 114 may also use the M5 interface to implement one or more security, authorization, and/or authentication mechanisms for the media sessions, and/or to report QoE metrics. In addition or alternatively, the 5GMS AF 118 may communicate Service Access Information to the media session handler 114 through the M5 interface in order to share configuration information about edge processing. In addition or alternatively, the 5GMS AF 118 may use the M5 interface to communicate consumption reporting and/or metrics reporting configuration information that is provisioned over the M1 interface and passed to the 5GMS client 112 by the 5GMS AF 118.

The M6 interface is an interface between the media session handler 114 and the media stream handler 116 and/or between the media session handler 114 and the 5GMS-aware application 110 for communication between two or more of the 5GMS-aware application 110, the media session handler 114, and the media stream handler 116. The media session handler 114 and/or the media stream handler 116 may use the M6 interface to configure the 5GMS-aware application 110 with 5GMS functionality or otherwise enable the 5GMS-aware application 110 to make use of 5GMS functionality. In addition or alternatively, the M6 interface may be used to configure 5GMS-related data reporting for the 5GMS-aware application 110.

The M7 interface is an interface between the media session handler 114 and the media stream handler 116, and between the media stream handler 116 and the 5GMS-aware application 110. The M7 interface may allow the media session handler 114 and/or the 5GMS-aware application 110 to make use of the media player of the media stream handler 116, and/or used for configuration of QoE metrics to be measured and logged and/or the collection of metrics measurement logs by the user device 106. In addition or alternatively, the M7 interface may be used to configure, activate, and/or stop media capturing, media encoding, and/or media upstream client functions.

The M8 interface is an interface between the 5GMS application provider 108 and the 5GMS-aware application 110. In any of various configurations, the 5GMS application provider 108 may use the M8 interface to provide various information directly to the 5GMS-aware application 110, including Service Access Information, remote control commands, service announcement information, as non-limiting examples.

In addition, as previously described, the 5GMS system 100 of FIG. 1 is edge-enabled and/or capable of performing edge processing in order to perform 5G media streaming. The 5GMS system 100 may be edge-enabled by being configured with edge components that provide one or more of 5GMS components with edge computing or processing functionality. In this regard, the 5GMS AF 118 and the 5GMS ASs 120 may each be edge-enabled components and/or be configured to perform edge processing, as indicated by being part of the edge DN 106. Additionally, the user device 102 may be edge-enabled, at least by being able to communicate with the edge-enabled 5GMS 118 and the edge-enabled 5GMS AS 120 for media streaming. The 5GMS AF 118 may be an edge-enabled component at least by including a first type of edge component called an edge enabler server (EES) 122. Also, each 5GMS AS 120 may be an edge-enabled component by including a second type of edge component called an edge application server (EAS) 124. In addition, the user device 102 may be an edge-enabled component by including a third and fourth types of edge component called an edge enabler client (EEC) 126 and/or an application client 128, respectively. The edge components may also include an edge configuration server (ECS) 130. The edge components may communicate with each other according to one or more specifications, standards, and/or protocols, such as 3GPP TS 23.558 for example.

In general, the EES 122 supports, or is configured to perform, functions to support operation of the EAS(s) 124 and the EEC 126, including provisioning of configuration information to the EEC 126 and/or enabling exchange of application data traffic with the EAS(s) 124. Also, for at least some embodiments, the EES 122 may perform additional functions such as interacting with a core network (not shown in FIG. 1) to access capabilities of network functions, performing context transfer with the EEC 126, supporting external exposure of network and service capabilities to the EAS(s), registration functions (including registration, update, and de-registration for the EEC 126 and the EAS(s)

124, and/or triggering EAS instantiation on demand, as non-limiting examples. Other functions performed by the EES 122 may be possible.

In addition, in general, an EAS 124 is be configured to connect to the user device 102 to avail services of the 5GMS-aware application with the capability of edge computing. In addition, an EAS 124 may consume core network capabilities, such as by invoking core network capabilities via an edge enabler layer through the EES 122, invoking core network function APIs directly, and/or invoking core network capabilities through capability exposure functions. In addition or alternatively, an EAS 124 may expose its service APIs toward other EASs 124, such as by supporting API provider domain functions. In addition or alternatively, an EAS 124 may consume EAS service APIs exposed by other EASs, such as by supporting API invoker functionalities. Other functions or actions performed by an EAS 124 may be possible.

In addition, the EEC 126 is a module of the user device 102 configured to retrieve configuration information to enable the exchange of application data traffic with an EAS 124. Additionally, the EEC 126 may be configured to discover available EASs 124 in the Edge DN 106. In addition or alternatively, the EEC 126 may be configured to detect mobility events of the user device 106. For at least some configurations such as shown in FIG. 1, the EEC 126 may be part of or a component of the media session handler 114 of the user device 102, although other configurations where the EEC 126 is a separate component from the media session handler 114 may be possible.

In addition, the application client (AC) 128 is a module of the user device 102 that locates and/or connects to one or more EASs 124. For example, the AC 128 may determine to connect to an EAS 124 that it determines to be most suitable for servicing needs of the 5GMS-aware application 110. For at least some configurations such as shown in FIG. 1, the AC 128 may be part of or a component of the 5GMS-aware application 110, although other configurations where the AC 128 is a separate component from the 5GMS-aware application 110 may be possible.

In addition, in general, the ECS 130 is a module that provides supporting functions for the EEC 126 to connect with the EES 122. As example, the ECS 130 may provision edge configuration information to the EEC 126. For at least some configurations, the edge configuration information may include at least one of information for the EEC 126 to distinguish among multiple EESs 126, or information to establish a connection with one or more EESs 122. In some configurations, the ECS 130 may also support registration, update, and/or de-registration for the EES 122, and/or may interact with a core network to access capabilities of network functions. Other functions of the ECS 130 may be possible. For at least some configurations such as shown in FIG. 1, the ECS 130 is a component separate from each of the user device 102, the DN 104, and the edge DN 106, although other configurations where the ECS 130 is a component of the user device 102, the DN 104, or the edge DN 106 may be possible.

In addition, similar to the "M" interfaces used by the 5GMS components, the edge components may communicate with each other via a plurality of edge interfaces or APIs. As shown in FIG. 1, each edge interface is designated as EDGE-j, where j is an integer.

EDGE-1 is an interface between the EES 122 and the EEC 126. EDGE 1 may be used by the EES 122 and the EEC 126 to communicate information pertaining to registration and de-registration of the EEC 126 to the EES 122, retrieval and provisioning of EAS configuration information, discovery of EASs 124 available in the edge DN 106, and/or service continuity procedures.

EDGE-3 is an interface between the EES 122 and an EAS 124. The EES 122 and an EAS 124 may use EDGE-3 to: register the EAS 124 with the EES 122 (which may include registering availability information such as time constraints and/or locations constraints); de-register the EAS 124 from the ESS; perform discovery of target EAS (T-EAS) information to support application context transfer (ACT); provide access to network capability information (such as location information); and/or request the setup of a data session between the AC 128 and an EAS 124, including communicating QoS information. Other information may be communicated, and/or other functions may be performed, using EDGE-3.

EDGE-4 is an interface between the EEC 126 and the ECS 130. The ECS 130 may provision edge configuration information to the EEC 126 using EDGE-4.

EDGE-5 is an interface between the EEC 126 and the application client 128.

EDGE-6 is an interface between the EES 122 and the ECS 130. The EES 122 and the ECS 130 may use EDGE-6 to: register the EES 122 with the ECS 130; de-register the EES 122 from the ECS 130; and/or retrieve target ESS information from the ECS 130.

EDGE-9 is an interface between two EESs 122. Two EESs 122 may use EDGE-9 to discover target EAS information to support application context relocation (ACR); for performance of EEC context relocation procedures; and/or transparent transfer of application context during edge enabler layer (EEL) managed ACR.

Other edge interfaces, including those between an edge component and a core network, not shown in FIG. 1, may be part of or otherwise used by the edge-enabled 5GMS system 100, in various other example configurations.

Additionally, as used herein, Service Access Information is a set of one or more parameters and/or addresses used by the user device 102, such as by the 5GMS client 112, to activate and control a streaming session. For at least some example configurations, the Service Access Information may also include one or more parameters and/or addresses used to report service, content, and/or QoE metrics. In some configurations, the user device 102 may receive Service Access Information directly from the DN 104. In other configurations, the user device 102 may receive Service Access Information from a 5GMS AF 118 of the edge DN 106. By being edge-enabled, the media session handler 114 of the user device 102 may be configured use the Service Access Information to determine whether a media streaming session meets eligibility criteria for requesting edge resources.

As mentioned, the 5GMS components may communicate with each other via a plurality of Mi interfaces (e.g., APIs). In some implementations, the 5GMS-aware application 110 may use the M6 interface to configure or cause the media session handler 114 to discover and/or instantiate a new EAS 124 using the EEC 126 and/or via the EDGE-1 interface, through the EES 122, and without interaction with the 5GMS AF 118. This, in turn, may allow for a more efficient EAS discovery process. In general, an EAS 124 is instantiated when it is able to run an application to stream media with the user device 102. In particular implementations, when a 5GMS-aware application is to stream media content during a streaming session, an EAS 124 may be instantiated for the streaming session when it is able to run an application to allow the EAS 124 to stream media content with or for the 5GMS-aware application.

Figure 2:
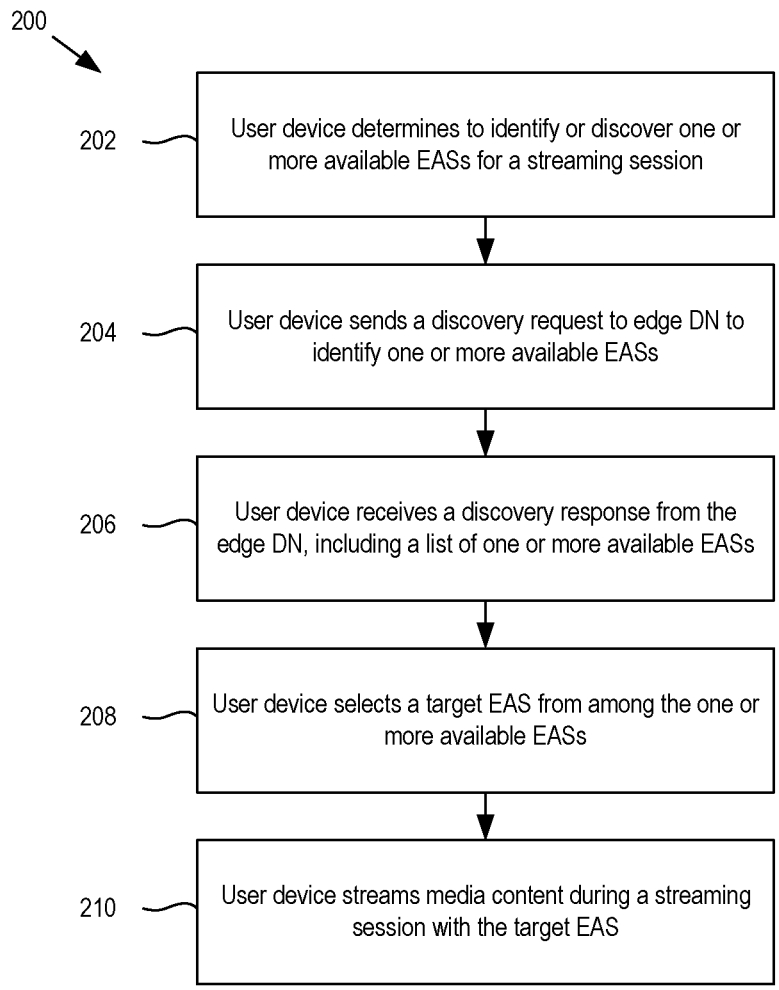
FIG. 2 shows a flow chart of an example method of media streaming performed by a user device.

FIG. 2 is a flow chart of an example method 200 of media streaming. The method 200 may be performed by a user device 102 that wants to stream media during a streaming session (in the downlink and/or uplink direction). At block 202, the user device 102 may determine to identify or discover one or more available EASs 124 and/or a target EAS 124 from among the one or more available EASs 124 for a streaming session. In some implementations, the user device 102 may determine to identify the one or more available EASs and/or a target EAS 124 in response to receipt of Service Access Information from the edge DN 106. For example, the media session handler 114 may receive the Service Access Information from the 5GMS AF 118 via the M5 interface. Also, the Service Access Information may indicate to the user device 102 that edge services may be available to the user device 102, which in turn may prompt the user device 102 to want to discover one or more available EASs 124 and/or select a target EAS 124 from among the one or more available EASs 124 for the streaming session. Also, for some implementations, the media session handler 114 may indicate the availability of edge services to the 5GMS-aware application 110, such as via the M6 interface. In particular of these implementations, the media session handler 114 may provide at least one of the following parameters to the 5GMS-aware application via the M6 interface: a list of one or more providers of one or more EAS instances 124; one or more EAS types; or one or more EAS features. Table 1 below provides a list of such parameters:

TABLE 1

Parameters Provided by Media Session Handler to 5GMS-Aware Application

| Parameters | Definition |
| --- | --- |
| _easProviderIds | The list of providers |
| _easType | The type of 5GMS EAS instances associated with this Provisioning Session. |
| _easFeatures | 5GMS Service features provided by edge servers |

As indicated in Table 1, one or more of the parameters may be for a particular provisioning session. In addition or alternatively, one or more of the parameters that the media session handler 114 provides to the 5GMS-aware application 110 may have been included in the Service Access Information that the 5GMS AF 118 provides to the media session handler 114 via the M5 interface.

The 5GMS-aware application 110 may respond back to the media session handler 114 with a request to user the edge services, such as via the M6 interface. In this way, the 5GMS-aware application 110 may trigger discovery of EAS instances 124, such as via the M6 interface. In some implementations, the 5GMS-aware application 110 may include an application client type (e.g., _acType as defined in 3GPP TS24.558) with its request. In response, the media session handler 114 may instruct or request the EEC 126 to send a discovery request for a list of available EASs 124. The media session handler 114 may use an internal API send to send the instructions or request to the EEC 126.

At block 204, the user device 102 may send a discovery request to receive a list of one or more available EASs to participate in the streaming session. The user device 102 may send the discovery request via the EDGE-1 interface.

For example, the EEC 126 may send the discovery request to the EES 122 of the edge DN 106 via the EDGE-1 interface. The discovery request may include one or more discovery filters, where each discovery filter includes a characteristic that it wants an available EAS 124 to have or with which it wants an available EAS to be associated. Non-limiting examples of an EAS filter include: an EAS provider identification (ID) that identifies an acceptable provider of 5GMS EAS instances, which may include those associated with a particular provisioning session; one or more EAS types; one or more EAS features for an EAS 124 to have or support; a service key performance indicator (KPI), which includes one or more service characteristics; one or more service areas, including one or more geographical areas for an EAS 124 to serve; a service availability schedule of an EAS 124, or a service continuity scenario, which includes one or more application context relocation scenarios for an EAS to support. The discovery request may also include a particular value for each discovery filter.

At block 206, the user device 102 may receive a discovery response from the edge DN 106, which may include the requested list of one or more available EASs 124. For example, the EEC 126 may receive the discovery response from the EES 122 via the EDGE-1 interface. In this way, the user device 102 may interact with the edge DN 106 to perform discovery without interacting with the 5GMS AF 118 besides the EES 122 via the EDGE-1 interface. Additionally, each of the one or more available EASs 124 identified in the list may have been determined by the edge DN as satisfying the discovery request. The edge DN 106 may perform discovery filter value matching that seeks to match the discovery filter values included in the discovery filter request with characteristics of candidate EASs 124. In general, as used herein, a candidate EAS 124 is an EAS 124 that the edge DN 106 is aware of that could possibly satisfy a discovery request before discovery value matching is performed. The edge DN 106 may use any of various criteria for determining whether a given candidate EAS 124 satisfies a discovery request, such as identifying that a candidate EAS matches a threshold number of discovery request filter values, as a non-limiting example.

At block 208, the user device 102, such as with the EEC 126 and/or the media session handler 114, may select a target EAS 124 from among the one or more available EASs 124 included in the discovery response. The user device 102 may select the target EAS 124 may determining that the target EAS 124 is the best or most suitable EAS 124 from among the listed one or more available EASs 124 for the streaming session. The user device 102 may use any of various criteria for selecting the target EAS 124. At block 210, the user device 102 may stream media (in the downlink direction and/or the uplink direction) during the streaming session with the target EAS 124. For example, the media stream handler 116 may stream media with the target EAS 124 via the M4 interface. In some implementations, such as part of block 208 or block 210, the media session handler 114 may acknowledge the target EAS 124 to the 5GMS-aware application 110, such as via the M6 interface. For example, the media session handler 114 may indicate to the 5GMS-aware application 110 that expressly identify the target EAS 124 such as with an EAS ID of the target EAS 124, that it has selected or otherwise determined a target EAS 124 for the streaming session, and/or otherwise confirm or acknowledge to the 5GMS-aware application 110 that it is using, or will use, edge services for the streaming session.

Figure 3:
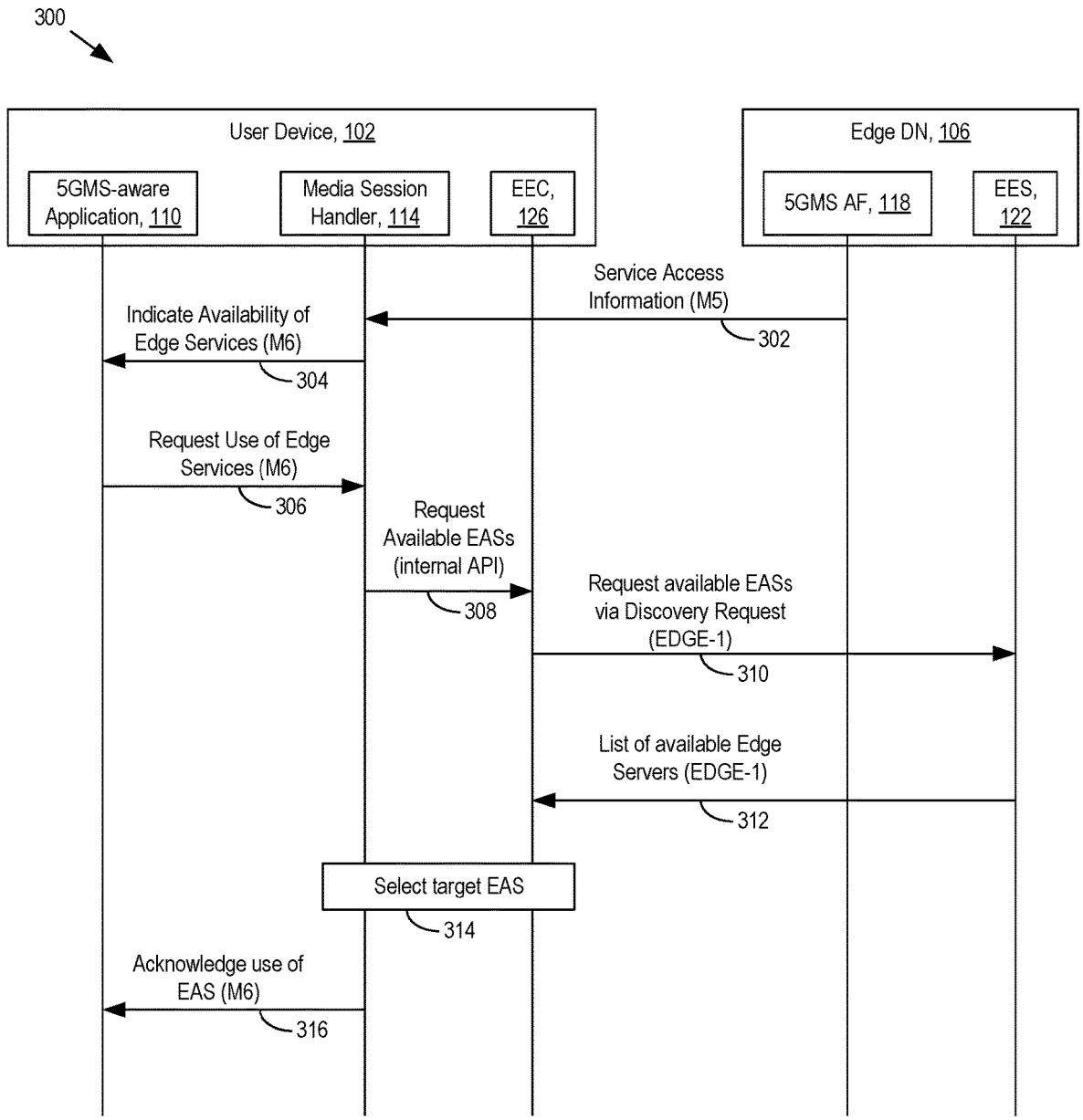
FIG. 3 shows an interaction diagram of an example method of discovering a target edge application server.

FIG. 3 is an interaction diagram of a method 300 of discovering a target EAS 124. At block 302, the 5GMS AF 118 may provide Service Access Information to the media session handler 114 via the M5 interface. As previously described, the Service Access Information may indicate edge service availability information to the user device 102. For example, the Service Access Information may include one or more of: a list of 5GMS application providers, one or more types of EAS instances 124, or one or more EAS features provided or supported by one or more EAS instances 124. The Service Access Information may be associated with a particular provisioning session, as previously described. At block 304, in response to receipt of the Service Access Information, the media session handler 114 may provide an indication of edge services availability to the 5GMS-aware application 110, such as via the M6 interface. For at least some implementations, the indication may include at least one of the list of 5GMS application providers, the one or more EAS types, or the one or more EAS features included in the Service Access Information.

At block 306, the 5GMS-aware application 110 may request the use of edge services via the M6 interface. In this way, the 5GMS-aware application 110 may trigger the discovery of available EASs 124 via the M6 interface. Additionally, for at least some implementations, the request from the 5GMS-aware application may include an application client type (acType) of the application client 128 of the 5GMS-aware application 110. At block 308, the media session handler 114 may send a request via an internal API to the EEC 128 to request available EASs 124. At block 310, the EEC 128 may send a discovery request to the EES 122 via the EDGE-1 interface. The discovery request may include one or more discovery filters and associated values for available EASs to satisfy. At block 312, the EEC 126 may receive a discovery response request including a list of one or more available EASs 124 that satisfy the discovery request from the EES 122 via the EDGE-1 interface. At block 314, the media session handler 114 and/or the EEC 126 may select a target EAS 124 from among the one or more available EASs 124 indicated in the discovery response. The target EAS 124 may be a best or most suitable EAS 124 from among the one or more available EASs 124 for a streaming session with the 5GMS-aware application 110. The media session handler 114 and/or the EEC 126 may use any of various criteria to make the selection, as previously described. At block 316, the media session handler 114 may acknowledge the user of edge services and/or the target EAS 124 to the 5GMS-aware application 110 via the M6 interface.

Accordingly, the implementations described herein may include a 5GMS-aware application 110 of a user device 102 configured to discover and/or instantiate one or more EASs 124. The M6 interface may be used to indicate to the 5GMS-aware application 110 that edge services are available, such as by providing information about the serve server providers, their types, and/or available EAS features. The 5GMS-aware application 110 may trigger the discovery of available EASs 124 using the M6 interface by providing its application type. Further, the media session handler 114 may use one or more 5G edge server discovery interfaces (e.g., one or more APIs) to discover the EASs 124, and/or may acknowledge the discovery and/or use of the discovered EASs 124 to the 5GMS-aware application 110.

In addition, as used herein, the term module refers to electronics, implemented in hardware only or a combination of hardware or software, configured to implement or carry out one or more functions or actions. For example, a module may include a circuit, digital logic circuitry, a processor (e.g., a central processing unit (CPU)) or a controller, configured to execute computer executable instructions, a memory storing computer executable instructions configured to be executed by a processor or a controller, or any of various combinations thereof.

Further, the techniques described above, can be implemented as computer software using computer-readable instructions and physically stored in one or more computer-readable media. For example, FIG. 4 shows a computer system 400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 4:
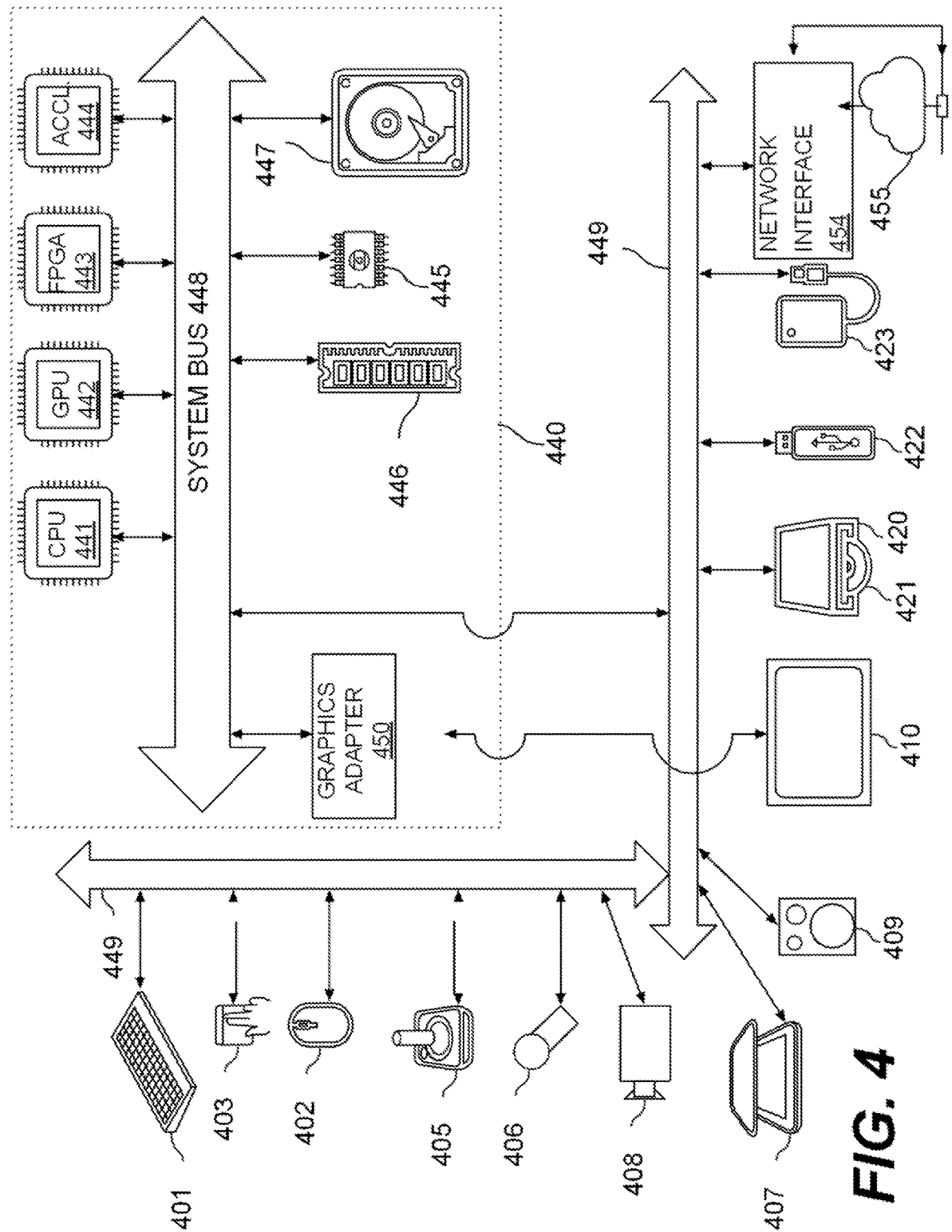
FIG. 4 shows a block diagram of an example computer system.

The components shown in FIG. 4 for computer system 400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 400.

Computer system 400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 401, mouse 402, trackpad 403, touch screen 410, data-glove (not shown), joystick 405, microphone 406, scanner 407, camera 408.

Computer system 400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 410, data-glove (not shown), or joystick 405, but there can also be tactile feedback devices that do not serve as input devices), audio output devices (such as: speakers 409, headphones (not depicted)), visual output devices (such as screens 410 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 400 can also include human accessible storage devices and their associated media such as optical media including CD/DVD ROM/RW 420 with CD/DVD or the like media 421, thumb-drive 422, removable hard drive or solid state drive 423, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 400 can also include an interface 454 to one or more communication networks 455. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses 449 (such as, for example USB ports of the computer system 400); others are commonly integrated into the core of the computer system 400 by attachment to a system bus as described below (for example Ethernet interface into a PC computer system or cellular network interface into a smartphone computer system). Using any of these networks, computer system (400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 440 of the computer system 400.

The core 440 can include one or more Central Processing Units (CPU) 441, Graphics Processing Units (GPU) 442, specialized programmable processing units in the form of Field Programmable Gate Areas (FPGA) 443, hardware accelerators for certain tasks 444, graphics adapters 450, and so forth. These devices, along with Read-only memory (ROM) 445, Random-access memory 446, internal mass storage such as internal non-user accessible hard drives, SSDs, and the like 447, may be connected through a system bus 448. In some computer systems, the system bus 448 can be accessible in the form of one or more physical plugs to enable extensions by additional CPUs, GPU, and the like. The peripheral devices can be attached either directly to the core's system bus 448, or through a peripheral bus 449. In an example, the screen 410 can be connected to the graphics adapter 450. Architectures for a peripheral bus include PCI, USB, and the like.

CPUs 441, GPUs 442, FPGAs 443, and accelerators 444 can execute certain instructions that, in combination, can make up the aforementioned computer code. That computer code can be stored in ROM 445 or RAM 446. Transitional data can also be stored in RAM 446, whereas permanent data can be stored for example, in the internal mass storage 447. Fast storage and retrieve to any of the memory devices can be enabled through the use of cache memory, that can be closely associated with one or more CPU 441, GPU 442, mass storage 447, ROM 445, RAM 446, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture 400, and specifically the core 440 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 440 that are of non-transitory nature, such as core-internal mass storage 447 or ROM 445. The software implementing various embodiments of the present disclosure can be stored in such devices and executed by core 440. A computer-readable medium can include one or more memory devices or chips, according to particular needs. The software can cause the core 440 and specifically the processors therein (including CPU, GPU, FPGA, and the like) to execute particular processes or particular parts of particular processes described herein, including defining data structures stored in RAM 446 and modifying such data structures according to the processes defined by the software. In addition, or as an alternative, the computer system can provide functionality as a result of logic hardwired or otherwise embodied in a circuit (for example: accelerator 444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The subject matter of the disclosure may also relate to or include, among others, the following aspects:

In a first aspect, a method for media streaming includes: sending, with a Fifth Generation Media Streaming (5GMS)-aware application of a user device, a request to use edge services to a media session handler of the user device via an M6 interface; subsequent to sending the request to use the edge services, sending, with an edge-enabler client (EEC) of the user device, a discovery request for one or more available edge application servers (EASs); receiving, with the EEC, a discovery response indicating the one or more available EASs; selecting, with at least one of the EEC or the media session handler, a target EAS from among the one or more available EASs indicated in the discovery response; and streaming, with the user device, media content communicated with the target EAS.

A second aspect includes the first aspect, and further includes wherein the sending of the discovery request is triggered by the sending of the request to use the edge services from the 5GMS-aware application to the media session handler via the M6 interface.

A third aspect includes any of the first or second aspects, and further includes wherein the request to use the edge services includes an application client type of the 5GMS-aware application.

A fourth aspect includes any of the first through third aspects, and further includes: sending, with the media session handler, an indication of an availability of the edge services to the 5GMS-aware application.

A fifth aspect includes the fourth aspect, and further includes wherein the indication is sent over the M6 interface between the 5GMS-aware application and the media session handler.

A sixth aspect includes any of the fourth or fifth aspects, and further includes wherein the indication comprises at least one of: a list of one or more providers of one or more EAS instances; one or more EAS types; or one or more EAS features.

A seventh aspect includes any of the fourth through sixth aspects, and further includes: receiving, with the media session handler, Service Access Information from a 5GMS application function (AF), wherein the indication is sent to the 5GMS-aware application in response to receiving the Service Access Information.

An eighth aspect includes any of the first through seventh aspects, and further includes wherein the discovery request and the discovery response are both communicated over an EDGE-1 interface between the EEC and an edge enabler server (EES).

A ninth aspect includes any of the first through eighth aspects, and further includes: acknowledging, with the media session handler, use of the target EAS to the 5GMS-aware application.

A tenth aspect includes a media streaming device that includes: a memory storing a plurality of instructions; and a processor configured to execute the plurality of instructions, and upon execution of the plurality of instructions is configured to implement any of the first through ninth aspects.

An eleventh aspect includes a non-transitory computer readable storage medium storing a plurality of instructions executable by a processor, wherein upon execution, the plurality of instructions is configured to cause the processor to implement any of the first through ninth aspects.

In addition to the features mentioned in each of the independent aspects enumerated above, some examples may show, alone or in combination, the optional features mentioned in the dependent aspects and/or as disclosed in the description above and shown in the figures.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

3GPP: Third Generation Partnership Project
5GMS: Fifth Generation Media Streaming
AC: Application Client
ACR: Application Context Relocation
ACT: Application Context Transfer
AF: Application Function
AS: Application Server
DN: Data Network
EAS: Edge Application Server
ECS: Edge Configuration Server
EEC: Edge Enabler Client
EEL: Edge Enabler Layer
EES: Edge Enabler Server
KPI: Key Performance Indicator
UE: User Equipment

What is claimed is:

1. A method for media streaming, the method comprising:
sending, with a Fifth Generation Media Streaming (5GMS)-aware application of a user device, a request to use edge services to a media session handler of the user device via an M6 interface;
subsequent to sending the request to use the edge services, sending, with an edge-enabler client (EEC) of the user device, a discovery request for one or more available edge application servers (EASs);
receiving, with the EEC, a discovery response indicating the one or more available EASs;
selecting, with at least one of the EEC or the media session handler, a target EAS from among the one or more available EASs indicated in the discovery response; and
streaming, with the user device, media content communicated with the target EAS.

2. The method of claim 1, wherein the sending of the discovery request is triggered by the sending of the request to use the edge services from the 5GMS-aware application to the media session handler via the M6 interface.

3. The method of claim 1, wherein the request to use the edge services comprises an application client type of the 5GMS-aware application.

4. The method of claim 1, further comprising:
sending, with the media session handler, an indication of an availability of the edge services to the 5GMS-aware application.

5. The method of claim 4, wherein the indication is sent over the M6 interface between the 5GMS-aware application and the media session handler.

6. The method of claim 4, wherein the indication comprises at least one of: a list of one or more providers of one or more EAS instances; one or more EAS types; or one or more EAS features.

7. The method of claim 4, further comprising:
receiving, with the media session handler, Service Access Information from a 5GMS application function (AF), wherein the indication is sent to the 5GMS-aware application in response to receiving the Service Access Information.

8. The method of claim 1, wherein the discovery request and the discovery response are both communicated over an EDGE-1 interface between the EEC and an edge enabler server (EES).

9. The method of claim 1, further comprising:
acknowledging, with the media session handler, use of the target EAS to the 5GMS-aware application.

10. A media streaming device comprising:
a memory storing a plurality of instructions; and
a processor configured to execute the plurality of instructions, and upon execution of the plurality of instructions is configured to:
send, with Fifth Generation Media Streaming (5GMS)-aware application, a request to use edge services to a media session handler via an M6 interface;
subsequent to the sending of the request to use the edge services, send, with an edge-enabler client (EEC), a discovery request for one or more available edge application servers (EASs);
receive, with the EEC, a discovery response indicating the one or more available EASs;
select, with at least one of the EEC or the media session handler, a target EAS from among the one or more available EASs indicated in the discovery response; and stream media content communicated with the target EAS.

11. The media streaming device of claim 10, wherein the processor, upon execution of the plurality of instructions, is configured to trigger the EEC to send the discovery request in response to the 5GMS-aware application sending the request to use the edge services to the media session handler via the M6 interface.

12. The media streaming device of claim 10, wherein the request to use the edge services comprises an application client type of the 5GMS-aware application.

13. The media streaming device of claim 10, wherein the processor, upon execution of the plurality of instructions, is further configured to:
send, with the media session handler, an indication of an availability of the edge services to the 5GMS-aware application.

14. The media streaming device of claim 13, wherein the processor, upon execution of the plurality of instructions, is configured to send the indication over the M6 interface between the 5GMS-aware application and the media session handler.

15. The media streaming device of claim 13, wherein the indication comprises at least one of: a list of one or more providers of one or more EAS instances; one or more EAS types; or one or more EAS features.

16. The media streaming device of claim 13, wherein the processor, upon execution of the plurality of instructions, is further configured to:
receive, with the media session handler, Service Access Information from a 5GMS application function (AF), wherein the indication is sent to the 5GMS-aware application in response to receipt of the Service Access Information.

17. The media streaming device of claim 10, wherein the processor, upon execution of the plurality of instructions, is configured to communicate the discovery request and the discovery response over an EDGE-1 interface between the EEC and an edge enabler server (EES).

18. The media streaming device of claim 10, wherein the processor, upon execution of the plurality of instructions, is further configured to:
acknowledge, with the media session handler, use of the target EAS to the 5GMS-aware application.

19. A non-transitory computer readable storage medium storing a plurality of instructions executable by a processor, wherein upon execution, the plurality of instructions is configured to cause the processor to:
send, with Fifth Generation Media Streaming (5GMS)-aware application, a request to use edge services to a media session handler via an M6 interface;
subsequent to the sending of the request to use the edge services, send, with an edge-enabler client (EEC), a discovery request for one or more available edge application servers (EASs);
receive, with the EEC, a discovery response indicating the one or more available EASs;
select, with at least one of the EEC or the media session handler, a target EAS from among the one or more available EASs indicated in the discovery response; and
stream media content communicated with the target EAS.

20. The non-transitory computer readable storage medium of claim 19, wherein the plurality of instructions, upon execution, is configured to cause the processor to trigger the EEC to send the discovery request in response to the 5GMS-aware application sending the request to use the edge services to the media session handler via the M6 interface.

* * * * *